(12) United States Patent
Breaux

(10) Patent No.: US 12,292,357 B2
(45) Date of Patent: May 6, 2025

(54) PRESSURE TESTING OF EQUIPMENT

(71) Applicant: ION PRO SERVICES, LLC, Cypress, TX (US)

(72) Inventor: Kenneth Breaux, Houston, TX (US)

(73) Assignee: ION PRO SERVICES, LLC, Cypress, TX (US)

( * ) Notice: Subject to any disclaimer, the term of this patent is extended or adjusted under 35 U.S.C. 154(b) by 0 days.

(21) Appl. No.: 18/776,846

(22) Filed: Jul. 18, 2024

(65) Prior Publication Data
US 2025/0044180 A1 Feb. 6, 2025

Related U.S. Application Data

(60) Provisional application No. 63/530,521, filed on Aug. 3, 2023.

(51) Int. Cl.
*G01M 3/28* (2006.01)
*G01K 13/02* (2021.01)
*G01M 3/32* (2006.01)

(52) U.S. Cl.
CPC .......... *G01M 3/2815* (2013.01); *G01K 13/02* (2013.01); *G01M 3/2823* (2013.01); *G01M 3/3209* (2013.01); *G01M 3/3254* (2013.01)

(58) Field of Classification Search
CPC .......... G01M 3/26–34; G01M 3/2815; G01M 3/2823; G01M 3/3209; G01M 3/3254; G01K 13/02
See application file for complete search history.

(56) References Cited

U.S. PATENT DOCUMENTS

| | | | | |
|---|---|---|---|---|
| 2,633,739 A | * | 4/1953 | Potts | G01M 3/2846 73/49.5 |
| 3,827,282 A | * | 8/1974 | Brister | G01M 3/00 73/40.5 R |
| 4,430,887 A | * | 2/1984 | Roberts | G01N 3/12 141/285 |

(Continued)

FOREIGN PATENT DOCUMENTS

EP 3760997 A1 1/2021

OTHER PUBLICATIONS

Ralston Instruments; "Fieldlab Hydrostatic Test Kits, A Digital Alternative to Cumbersome Chart Recorders"; 2023 (4 pages).

(Continued)

*Primary Examiner* — Nguyen Q. Ha
(74) *Attorney, Agent, or Firm* — EWING & JONES, PLLC

(57) ABSTRACT

A system and method enable pressure testing a specimen with a portable module for deployment to a field site of the specimen, such as a pipeline. The module includes a processor capable of controlling various devices, such as valves and pumps, and recording sensed data from multiple sources, such as pressure/temperature/flow sensors, cameras and weather feed. The processor may receive input operation specifications for execution to perform the testing with limited human interaction through pressurization, hold and depressurization phases of the testing. The module includes safety features that may avoid over pressurization, require operator identifiers or initiate interlock protocols upon the processor detecting an anomaly. The processor then outputs notifications and reports of desired parameters from the test.

22 Claims, 4 Drawing Sheets

(56) References Cited

U.S. PATENT DOCUMENTS

| | | | |
|---|---|---|---|
| 4,599,890 A * | 7/1986 | Girone | G01M 3/26 73/49.5 |
| 4,715,214 A | 12/1987 | Tveter et al. | |
| 5,092,162 A * | 3/1992 | Self | G01M 3/02 73/49.5 |
| 5,295,392 A | 3/1994 | Hensel et al. | |
| 5,883,303 A | 3/1999 | Bliss et al. | |
| 5,927,901 A | 7/1999 | Graves | |
| 6,052,057 A | 4/2000 | Yang et al. | |
| 6,435,010 B1 | 8/2002 | Johnson et al. | |
| 6,539,778 B2 | 4/2003 | Tucker et al. | |
| 6,578,408 B1 | 6/2003 | Denby | |
| 6,840,088 B2 | 1/2005 | Tucker et al. | |
| 7,708,839 B2 | 5/2010 | Yemington | |
| RE42,358 E | 5/2011 | Tucker et al. | |
| 8,240,191 B2 | 8/2012 | Loeb et al. | |
| 8,240,952 B2 | 8/2012 | Loeb et al. | |
| 8,240,953 B2 | 8/2012 | Loeb | |
| 8,381,578 B2 | 2/2013 | Sweeney | |
| 8,430,168 B2 | 4/2013 | Goodall et al. | |
| 8,731,849 B2 | 5/2014 | Westra et al. | |
| 8,746,042 B2 | 6/2014 | Sweeney | |
| 8,935,106 B2 | 1/2015 | Balogh et al. | |
| 10,190,298 B2 * | 1/2019 | Slate | E03B 7/071 |
| 2008/0282776 A1 | 11/2008 | Loeb et al. | |
| 2008/0282777 A1 | 11/2008 | Loeb | |
| 2009/0288836 A1 | 11/2009 | Goodall et al. | |
| 2010/0085064 A1 | 4/2010 | Loeb et al. | |
| 2010/0089126 A1 | 4/2010 | Sweeney | |
| 2013/0110417 A1 | 5/2013 | Balogh et al. | |
| 2020/0256757 A1 | 8/2020 | Sixsmith | |
| 2021/0372094 A1 | 2/2021 | Al-Muslim et al. | |
| 2022/0244130 A1 * | 8/2022 | Shintaku | G01M 3/2815 |

OTHER PUBLICATIONS

Vaetrix; "Vaetrix HTG Series User Manual"; Apr. 13, 2022 (35 pages).

* cited by examiner

PRESSURE TESTING OF EQUIPMENT

CROSS-REFERENCE TO RELATED APPLICATIONS

This application is a nonprovisional application which claims priority from U.S. provisional application No. 63/530,521, filed Aug. 3, 2023, which is incorporated by reference herein in its entirety.

TECHNICAL FIELD/FIELD OF THE DISCLOSURE

The present disclosure relates generally to systems and methods for filling, conducting pressure operations and removing fluid medium from a vessel to determine behavior, integrity, or leaking of pressurized fluid containing vessels or to control the speed and position of a pig in a pipe.

BACKGROUND OF THE DISCLOSURE

Safe operation of equipment often requires initial or routine pressure testing to determine if the equipment meets standards or leaks. Testing of the equipment in field conditions includes unique challenges and contributes to multiple problems. Past approaches rely on operators to conduct tasks themselves according to testing specifications and compile various measurements and observations resulting in several opportunities for potential operator errors. The field testing also often relies on various individual components, which are not able to communicate with each other. Potential hazards exist thus due to the operator needing to be onsite for manual operations or otherwise to act as an intermediary controlling independent components. Lack of integration and use of past devices may compromise test results, delay critical actions needed during the testing operations and fail to ensure proper components are provided and connected to run the test in a safe and reliable manner.

SUMMARY

In some embodiments, a system for conducting a pressure operation with a specimen includes a housing defining an exterior of a portable module with a supply port from the housing for coupling with the specimen to input fluid medium from the module into the specimen. The fluid medium is provided to a location inside the portable module via one of: an inlet port into the housing and a self-contained supply of the fluid medium disposed in the housing. The system further includes a conduit disposed in the housing connecting the supply port with the location inside the portable module where the fluid medium is provided, a valve disposed in the housing to control flow through the conduit, a pressure sensor disposed to sense pressure of the fluid medium in the conduit, and a flow meter disposed to sense flow through the conduit. A processor includes programming to execute an operation specification inputted into the module by controlling the valve to adjust pressure in the specimen, record data from the flow meter and the pressure sensor and output a report.

For some embodiments, a method of conducting a pressure operation with a specimen includes transporting a portable module to a site of the specimen, connecting the module to a source for a fluid medium and to the specimen and inputting an operation specification into a processor disposed in the module. In addition, the method includes passing the fluid medium though a valve inside the module and then into the specimen and executing the operation specification with the processor that then controls the valve thereby adjusting pressure in the specimen through pressurization, hold pressure and depressurization phases in accordance with the operation specification. Sensing pressure and flow of the fluid medium within the module provides measured data for outputting from the processor a report containing the measured data.

According to some embodiments, a system for conducting a pressure operation with a specimen includes a housing in shape of a case to define an exterior of a portable module, a source line coupling an inlet port into the housing with a fluid medium, and a supply line coupling a supply port from the housing with the specimen to input the fluid medium from the module into the specimen. Further, the system includes inlet, outlet and isolation valves disposed along a conduit in the housing through which the inlet port and the supply port are in fluid communication and flow and pressure sensors disposed in the housing along the conduit to measure properties of the fluid medium input into the specimen. A processor disposed in the housing includes programming to execute an operation specification inputted into the module by controlling each of the valves in order to fill the specimen with the fluid medium and raise, hold and lower pressure within the specimen without additional input, record data from the sensors, and output a report.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
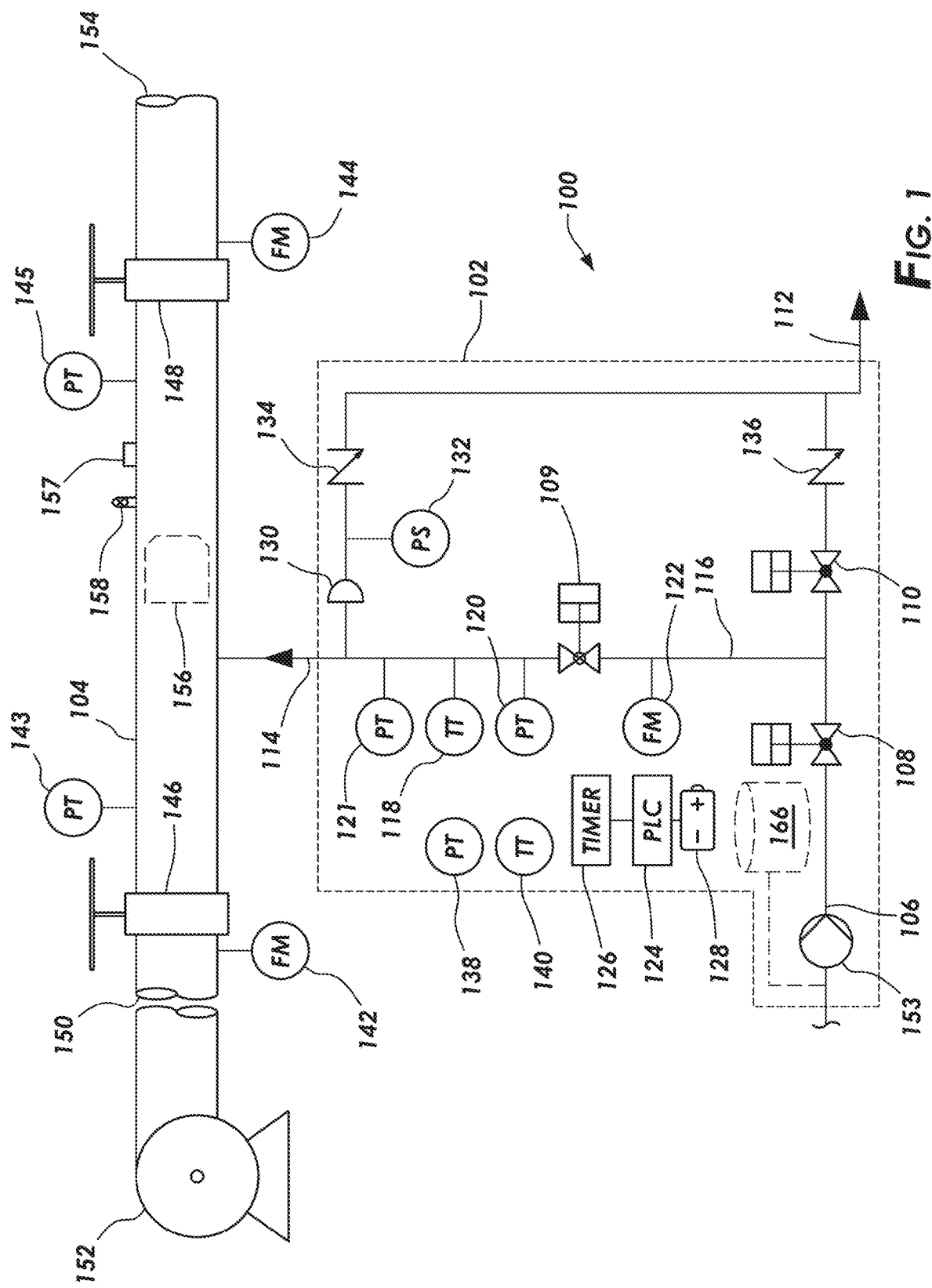
FIG. 1 is a flow diagram of a pressure testing system coupled to a specimen, shown as a pipeline, consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In certain embodiments, the disclosure is directed to a system to pressure test a vessel containing fluid in order to determine integrity or leaking of the vessel. In some embodiments, a method of pressure testing employs the system to report test results about the vessel to a recipient.

FIG. 1 depicts a schematic of an embodiment of a pressure testing system having a portable module 100. The module 100 may include a housing 102 configured based on pressures and volumes of fluid medium required. For large scale testing, a skid or shipping container may form the housing 102 and may be of dimensions suitable for highway transport on a flatbed trailer, e.g., less than eight feet wide, less than fifty feet long and less than ten feet tall. A case may provide the housing 102 for embodiments when testing specimens that have a volume less than about two hundred and fifty thousand gallons. The housing 102 in form of the case may be about the size of a large suitcase enabling the module 100 to be shipped and handled in the field by one or two people. For example, the module 100 may be disposed on a hand truck or wagon for portability. Shell of the housing 102 may be constructed, for example, of plastic such as polypropylene and in some embodiments may be waterproof to enclose and protect internal parts of the module 100. The module 100 as shown in FIG. 1 thus provides a transportable unit for job site or field deployment to conduct pressure testing of a specimen, such as a pipeline, offshore equipment/vessels or pipe 104. While the housing 102 is shown and described herein as enclosing certain components, other embodiments may not use the housing 102 or may employ multiple enclosures with such components in separate cases.

The module 100 includes an inlet port 106 extending through the housing 102, an inlet valve 108 inside the housing 102, an outlet valve 110 inside the housing 102, an outlet port 112 extending through the housing 102 and a fluid supply port 114 extending through the housing 102 all coupled together with conduit 116 for selective communication as described herein. Detectors, such as a pressure sensor 120, a pressure secondary sensor 121, a supply flow meter 122, and a temperature sensor 118, located in the housing 102 measure attributes of the fluid medium flowing through the module 100 in operation and send data to a data logger or a processor 124, such as a programmable logic controller, also disposed in the housing 102. The pressure secondary sensor 121 may provide redundancy to the pressure sensor 120 for meeting certain testing regulations. During any phase of the testing, the processor 124 in some embodiments compares the relationship between temperature of the fluid medium as measured with the temperature sensor 118 and/or at the pipe 104, and the fluid medium pressure measured with the pressure sensor 120 (or the inlet pressure transducer 143, or the outlet pressure transducer 145) to determine if any changes in pressure are due to changes in temperature, vessel behavior, or a leak.

The supply port 114 connects to the conduit 116 along a flow line of the conduit 116 that intersects a portion of the conduit between the inlet valve 108 and the outlet valve 110 to form a "T" arrangement. In some embodiments, an isolation valve 109 operates to close or regulate the flow on part of the conduit 116 extending from between the inlet and outlet valves 108, 110 ahead of the sensors 118, 120 disposed before the supply port 114. In some embodiments, the sensors 118, 120 may be disposed to take measurements after the supply port 114 and hence are not coupled to the conduit 116 in the housing 102 and may be carried separately or inside the housing 102 prior to deployment for operation. Examples of the valves 108, 109, 110 include actuatable/solenoid valves such as globe valves or needle valves. Some embodiments may combine one or more of the valves 108, 109, 110 and thereby, for example, employ a three-way valve functioning to control flow from the inlet port 106 and selectively to the outlet port 112 and the supply port 114. The processor 124 may also operate to control functioning of the valves 108, 109, 110 and report on positions of the valves 108, 109, 110 throughout the testing.

The processor 124 couples to a timer 126, which may be synced with actual time, in the housing for scheduling control commands and/or recording a clock stamp/log of events/measurements taken during testing. While some embodiments plug the module 100 into an electrical source (e.g., grid, generator, solar), the entire module 100 may, to facilitate portability, operate on a battery 128 shown connected to the processor 124. The battery 128 or multiple other batteries may further power any other parts within the housing 102, e.g., the timer 126, the valves 108, 109, 110 and the sensors and meter 118, 120, 122 already mentioned, or other system components as described herein employed in the testing and disposed outside of the housing 102.

For some embodiments, an overpressure relief device 130, such as a valve or a disc, in the housing 102 couples in fluid communication with the supply port 114 to allow for pressure to be relieved if a pressure threshold is exceeded in the conduit 116 within the module 100 and/or the pipe 104 connected thereto. A pressure detector 132 downstream of the overpressure relief device 130 enables notification to the processor 124 in event of the overpressure relief device 130 relieving pressure. If the overpressure relief device 130 relieves pressure, the processor 124 may stop the test processes and send a notification. A first one-way check valve 134 disposed in the housing 102 on the flow path between the pressure detector 132 and the outlet port 112 along with a second one-way check valve 136 disposed in the housing 102 on the flow path between the outlet valve 110 and the outlet port 112 function to prevent backflow through the module 100 from the outlet port 112.

In some embodiments, the housing 102 contains a first air sensor 138 for measuring atmospheric pressure and a second air sensor 140 for sensing atmospheric temperature. Other embodiments may use a temperature sensor on the pipe 104 (i.e., pipe temperature and/or temperature of the fluid medium in the pipe 104) and/or in the ground. Data from the air sensors 138, 140 feeds to the processor 124 during the testing. The processor 124 in some embodiments further records and stores the weather as reported on a weather service. As with any other information input to the processor 124, data from the air sensors 138, 140 or the weather service may be stored to the cloud or in memory of the processor 124 and may be used in test reporting and/or in various interlock protocols as described further herein. For example, the processor 124 may initiate an interlock protocol and stop the test if the pipe temperature, fluid medium temperature, or ambient temperature exceed or fall below predetermined temperatures. Stopping of the test may include the processor 124 halting sending further control commands to valves, such as the valves 108, 109, 110, or fill or pressure pumps 152, 153 until the operator inputs approval or the processor 124 opening of the isolation valve 109 and the outlet valve 110 to relieve pressure from the pipe 104. The processor 124 may start or restart sending the control commands without input from the operator once all operation specifications, which may include requirements or ranges inputted into the processor 124 for pressures, temperatures, flowrate, timing and/or valve/pump control and calculated determinations to confirm expected pressures, temperatures and/or flowrate, have been met. Any reporting, such as printouts or sending of messages to the operator, from the processor 124 or inputs, such as the operation specification, updates to the operation specification or approvals, of the operator into the processor 124 may be at specified intervals, continuous or event triggered, such as any of the detections or calculations being identified as an anomaly from detected results, other anomaly in the operation specifications being obtained, or upon successful completion of a phase.

While not disposed in some embodiments within the housing 102 of the module 100, the module 100 via the processor 124 may communicate with and/or operate to control additional components or auxiliary sensors through wired connections or wireless signals. Examples of such components shown in FIG. 1 include an input flow meter 142, an inlet pressure transducer 143, an exhaust flow meter 144, an outlet pressure transducer 145, a fill control valve 146, an exhaust control valve 148, a fill pump 152, a pressure pump 153, a vent valve 158 and a pipeline pig 156. The processor 124 may thereby report to the operator or any designee identified in the operation specification on data including valve positions, pressures and flow rates received from components outside the module 100 during the testing and/or send control commands to the components outside the module 100 in accordance with the operation specifications. The processor 124 may also control and report on the position and speed of the pig 156.

In some embodiments, a self-contained supply 166 of the fluid medium is disposed within the housing 102 such that the inlet port 106 is not needed and omitted. The self-contained supply 166 may be adequate for supplying all the fluid medium necessary for testing depending on the specimen. The conduit 116 thus connects at a location inside the portable module 100 to the self-contained supply 166. The fluid medium from the self-contained supply 166 may further be pressurized by, for example, the pressure pump 153 that may also be disposed in the housing 102 when the self-contained supply 166 is used.

Figure 2:
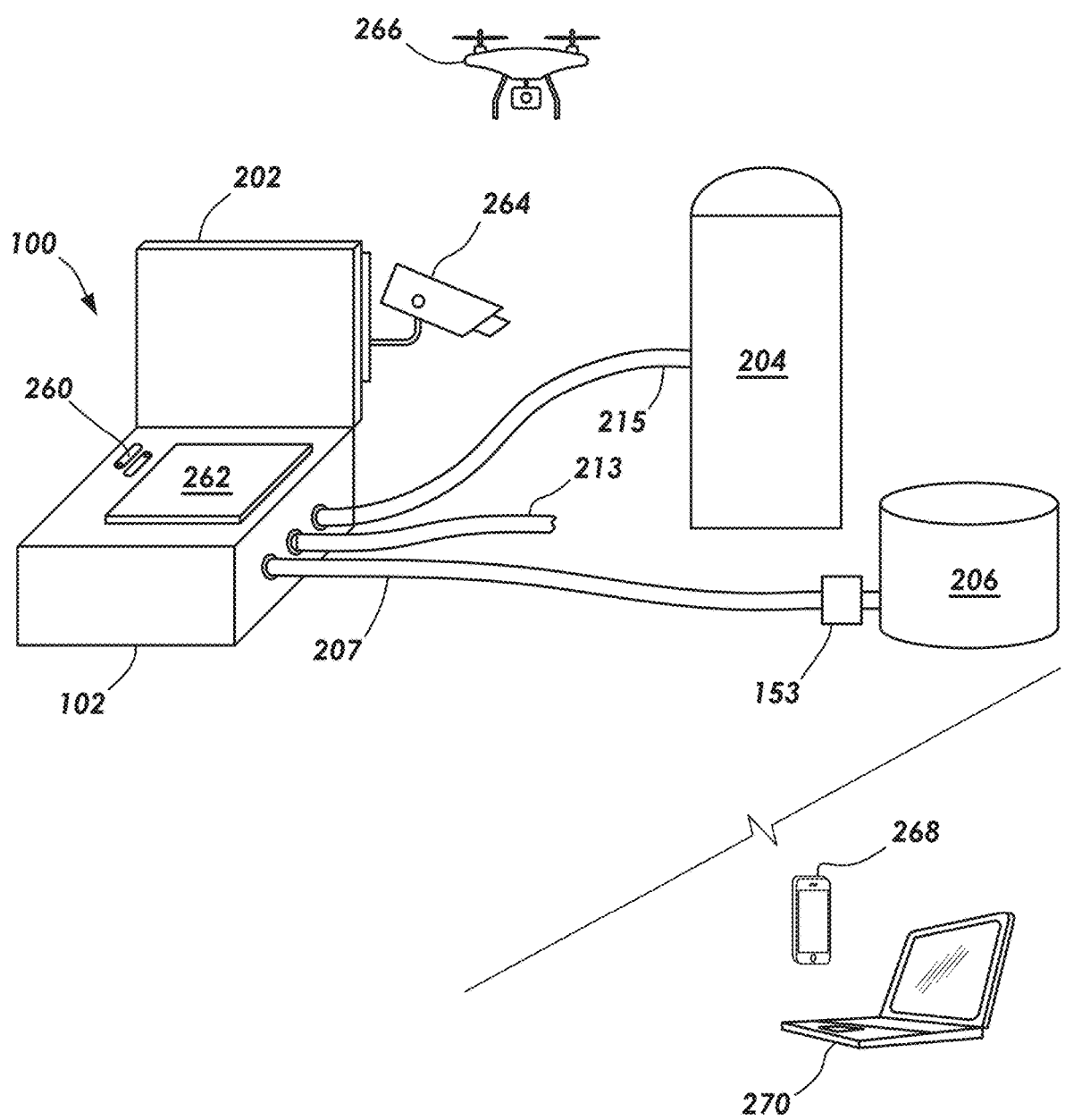
FIG. 2 is a view of the pressure testing system in operation and coupled to another specimen, depicted as a tank, consistent with certain embodiments of the present disclosure.

FIG. 2 shows a view of the portable module 100 in operation and coupled to another exemplary specimen, depicted as a tank 204 instead of the pipe 104. A supply hose 215 couples the tank 204 to the module 100 via the supply port 114 shown and described with respect to FIG. 1. Likewise, an inlet hose 207 couples a source 206 of fluid medium and the pressure pump 153 to the module 100 via the inlet port 106. An outlet hose 213 also couples to the module 100 via the outlet port 112 for discharge of the fluid medium from the module 100.

The module 100 may include one or more ways for the operator to input commands into the processor 124 and/or visualize the data acquired by the processor 124. For example, the module 100 may include an onboard user interface (e.g., touchscreen, keyboard, display, trackpad, speaker, lights, buttons and combinations thereof) 262 in the housing 102, a cloud connection and/or a link (e.g., web, cellular, WIFI, Bluetooth) with an offsite computer 270 or app on a phone/mobile device 268 for user interactions with the processor 124. A hinged lid 202 of the housing 102 may allow access to and protection of the user interface 262. Any attempt to enter a command to the module 100 or progress through testing stages conducted by the processor 124 may require entry of a unique login code, QR code, biometric or other identifier of the operator or communicating device for the module 100 to respond or proceed with the test. In some embodiments, the offsite computer 270 or the app on the phone/mobile device 268 enables entire testing to be performed without the operator onsite in the field and may enable control of the test or stopping the test remotely via the internet or other communication to offsite. An operator may not be needed for the testing once the module 100 is physically located onsite and connected with the hoses 215, 213 and 207. In addition, the processor 124 with the user interface 262, computer 270 or phone/mobile device 268 may provide any notifications or reporting described herein to the operator and/or real-time reporting of the test status (e.g., pass/fail) to designee(s), notices (e.g., mobile device banner/sound, email or text) to the designees, or publishing of test reports on a website, social media, and/or on an app.

Separate accessible valves or switches 260 on the housing 102 may provide easy access to shut down control of the testing by the operator. One of the switches 260 may be disposed to disconnect (e.g., electrical or valve) the pressure pump 153 from the supply port 114 connected to the tank 204 or the pipe 104. In some embodiments, the disconnect due to the switches 260 cannot establish connection until all pre-test tasks are completed as indicated on the user interface 262, phone/mobile device 268 or computer 270 by the operator, who may be required to have and enter approval authority.

Additional inputs to the processor 124 may include photo or video data from an infrared or multispectral camera 264 only shown attached to the lid 202 for illustration purposes. A video record of the tank 204, surrounding area, and the test setup obtained may be logged by the processor 124 and incorporated in the test record. During testing, the processor 124 may use image data to determine or monitor for indications of a leak and report to the operator. Heat signature (infrared), color changes or sheen changes offer examples of possible indications of a leak. The camera 264 in some embodiments may be mounted on an aircraft or drone 266. The module 100 may further incorporate an acoustic transducer, which may be positioned on, near, or coupled to the device or pipe 104, to monitor an acoustic signal of the pipe 104 and/or other conduits associated with the testing to determine that a leak is present and report on the leak.

In a pressure testing operation with reference to FIGS. 1 and 2 and use of the pipe 104 as the specimen, an operator inputs the test or operation specification or a preloaded test or operation specification identifier into the processor 124 via the onboard user interface 262, the phone/mobile device 268 or the computer 270. The processor 124 may confirm the last calibration date of one or all sensors meets the calibration frequency in the specifications and report on the conformance of sensor calibration dates with the specifications. Auxiliary sensors, such as the input and exhaust flow meters 142, 144, pressure transducers 143, 145 or other pressure and temperature sensors on the pipe 104, sensors in the module 100 itself or any other devices connected to the module 100 may have a chip imbedded in the auxiliary sensor or in the line attaching the auxiliary sensor to the module 100 that lets the processor 124 know that the proper, calibrated sensor or device has been connected to the module 100 and not an imposture device. If the calibration records or sensor identifications do not conform to the specification, the processor 124 may not continue with the test unless the operator approves continuation.

For a fill phase of the testing, the pressure pump 153 coupled to the inlet port 106 supplies the fluid medium, such as water or a gas, under pressure to the module 100. The supply port 114 coupled to the pipe 104 provides the fluid medium from the module 100 into a length of the pipe 104 desired for the testing. The module 100 may provide the fluid medium at pressures from the pressure pump 153 as desired for the testing and hence higher than may be capable with the fill pump 152. Some volumes of specimens being tested enable filling with only the fluid medium coming from the module 100 and thus may not use the fill pump 152. The processor 124 may provide operating signals to the fill pump 152 and the pressure pump 153 for commands specifying parameters such as run/stop, RPM, volume output and pressure output.

When used, the fill pump 152 supplies the fluid medium to an infill side or port 150 of the pipe 104 proximate the fill control valve 146 before the fluid medium is supplied into the pipe 104 at higher pressures from the supply port 114. The module 100 operates to fill the pipe 104 at the rate, or range of rates, specified in the testing specifications by, for example, the processor 124 commanding the fill pump 152 to start and the fill control valve 146 to open. The processor 124 can initially provide for fill at a slower rate then gradually increase the fill rate to protect against air entrapment or entrainment. The fluid medium then fills the internal volume of the pipe 104 between the fill control valve 146 and the exhaust control valve 148 disposed toward an exit side 154 of the pipe 104 at which point the fill and exhaust control valves 146, 148 may be closed by the processor 124. The input flow meter 142 disposed on the infill side or port 150 of the pipe 104 proximate or at the fill control valve 146 enables measuring flow rates and volumes into the pipe 104 where subject of the testing. Similarly, the exhaust flow meter 144 disposed on the exit side 154 of the pipe 104 proximate or at the exhaust control valve 148 enables measuring flow rates and volumes out of the pipe 104 where subject of the testing. The flow meters 142, 144 may thus be disposed on either side of the control valves 146, 148, may be used with or without the pressure transducers 143, 145 and may be only one at either the infill side or port 150 of the pipe 104 or the exit side 154 of the pipe 104. In a similar manner, some embodiments include more or less of the pressure transducers 143, 145, which may be used with or without any of the flow meters 142, 144.

The pig 156 may precede the fluid medium during the filling and may separate the fluid medium from air or other fluid previously in the pipe 104. The processor 124 may use input on the speed of the pig 156 to alter the rate of fill. In addition, the processor 124 may provide notification of the location of the pig 156 to facilitate releasing fluid from the pipe 104. The processor 124 may stop filling or change the rate of filling the pipe 104 based on cumulative volume injected, pressure in the pipe 104 measured at any point, location of the pig 156, and/or volume of fluid being released at any point on the pipe 104. In some embodiments, the processor 124 may control/monitor the pig 156, such as smart pigs and ILI pigs (in-line inspection pigs) or any other pigs even if not associated with the pressure operation or testing.

Using the fill control valve 146 and/or the exhaust control valve 148, the processor 124 may adjust the speed at which the pig 156 or other tools travel in the pipe 104. Calculations for controlling the pig speed may be augmented by the input flow meter 142 and/or the exhaust flow meter 144. Location information of the pig 156 obtained from other sources may be fed to the processor 124 to provide information on the actual location or speed of the pig 156 or tool, and the processor 124 may then operate the fill and exhaust control valves 146, 148 to increase, reduce, or maintain speed of the pig 156.

As the pipe 104 is being filled or at any other phase of testing when adding or removing the fluid medium from the pipe 104, the processor 124 confirms that the volume of the fluid medium injected into the pipe 104 agrees with the pressures sensed and/or required in the specification by making calculations using scientific laws relating to fluid volumes, temperatures, and pressures. The calculation may indicate that the wrong specimen is being tested, the specimen is leaking or that the pipe 104 or testing equipment is not set up properly. As the pipe 104 is being filled, the processor 124 confirms that the volume used in the filling agrees with the predicted volume. Agreement between the predicted volume and sensed volume can indicate the module 100 is connected correctly or if, in disagreement, a valve or other obstruction exists in the pipe 104, module 100 or the supply hose 215. The processor 124 may allow for a hold time per the specifications so that after fill has been completed the pipe 104 is allowed to stabilize and/or allow for dissolved or entrapped air to be released and vented through the vent valve 158.

Regarding the entrapped air, the processor 124 may inject enough volume of the fluid medium into the pipe 104 to raise the pressure by a fixed amount. The rate of pressurization of the pipe 104 can be controlled by the processor 124 so that the pipe 104 is pressurized within a specified time. A comparison is made by the processor 124 between a change in volume of fluid medium that results in a change of the fluid medium pressure and the theoretical amount needed to determine the amount of entrapped and/or entrained air or gas. If the relationship between volume and pressure are within the allowable amounts, then the processor 124 continues with the testing. If the amounts are outside the allowable amounts, the processor 124 stops the test unless overridden by the operator. If the amount of air entrapped is not within a pre-determined zone, the processor 124 may increase the rate of fill so that the fluid medium can flush out entrapped air to move the entrapped air to the vent valve 158 or past exhaust control valve 148. Additionally, the relationship between volume, pressure and/or temperature may indicate a leak or other anomaly in or with the pipe 104. In addition or alternatively, the processor 124 may release a measured amount of pressure and compare the amount of pressure released with the corresponding amount of volume released as measured by the supply flow meter 122. Using the relationship between the amount of pressure released and the volume of fluid released, the processor 124 may determine if the pipe 104 has a volume of air in the system outside of specifications. The processor 124 may then report determinations on the air entrapment.

Further pressurization of the pipe 104 to the specified pressure of the test may occur next in a pressurization phase utilizing the module 100 operationally connected to the pressure pump 153. The processor 124 then opens inlet and isolation valves 108 and 109 to begin additional pressurization of the pipe 104. The processor 124 monitors and records the rate of flow and cumulative volume of fluid being added to the pipe 104 using the supply flow meter 122 and/or the timer 126. The processor 124 may also monitor and record the pressure and change in pressure using the pressure sensor 120 and the timer 126. Further, the controller may monitor the temperature and change in temperature of the pipe 104, atmosphere and/or ground using, for example, the temperature sensor 118 and second air sensor 140. The processor 124 may calculate (and control) the amount the isolation valve 109 must open/close to achieve a specified specimen pressure change within a specified duration to achieve the specification criteria. The isolation valve 109 and/or the inlet valve 108 then controls pressure in the conduit to the supply port 114 of the module 100 until the test pressure, or the pressure within a range of pressure, is reached. When pressure is reached, the processor 124 closes the isolation valve 109 and the inlet valve 108.

The module 100 then transitions into a stabilization phase where the pressure is held based on calculations using the fluid medium temperature/pressure. After the stabilization hold, the processor 124 may repressurize the pipe 104 to a specified pressure or within a range of pressures. Upon reaching test pressure, or range of pressures, the pipe 104 subject of the testing is again isolated, and the module 100 transitions into a hold pressure phase, which is when the pipe 104 in the section being tested is isolated from fluid entry and exit for a duration while pressure is monitored.

In the hold pressure phase, the processor 124 monitors and records the pressure measured with at least the pressure sensor 120 for a test duration per the specification operation. If the pressure does not drop more than the allowable limit, the test will be successful and reported accordingly. If allowed by the specifications, the processor 124 may open the inlet valve 108 and isolation valve 109 to add fluid medium to the pipe 104 or remove fluid medium through the outlet valve 110 from the pipe 104 by opening isolation valve 109 and outlet valve 110 as needed to maintain pressure within an allowable specified range. All volumes added or removed as measured by the supply flow meter 122 may be logged and time stamped along with a record of cumulative volumes.

Following the hold pressure phase, the processor 124 begins depressurization of the pipe 104 subject to the testing in a depressurization phase. In particular, the processor 124 opens the isolation valve 109 and the outlet valve 110 to allow the pipe 104 to drop pressure at a rate not to exceed the rate in the operation specifications. The processor 124 allows for the rate of depressurization to vary with time, depending on specification or behavior of the pipe 104. If the volume of fluid medium discharged as measured with the supply flow meter 122 exceeds the volume added (with an allowance), the processor 124 may also report on the deviation volumes in and out of the pipe 104. Once the pipe 104 reaches a specified pressure and, optionally, the volume discharged is equal to (within an allowance) the volume added, the processor 124 indicates completion of the test.

For any of the calculations relied on by the processor 124 throughout the testing, such calculating may use the processor 124 within the module 100 located in proximity to the pipe 104 or data may be sent to the cloud or other remote processor where calculations are performed and relayed back to the processor 124. The calculations may thus occur off site in real-time or near real-time or be predetermined and input to the processor 124 in the specifications or any specification updates during the testing. Making the calculations enables the processor 124 to send appropriate command signals to execute the testing and also may result in interlock protocols by the processor 124 where testing is stopped or halted pending operator approval due to discrepancy in the calculations from actual results of the testing.

The processor 124 may be used as described herein to control the rate of fluid being injected into the pipe 104 to displace the pipe contents. In some embodiments, the pig 156 is used to separate a displacement fluid from the fluid medium. The pressure pump 153 introduces the displacement fluid into the inlet port 106 and through inlet valve 108, which is controlled by the processor 124. The isolation valve 109 is also controlled by the processor 124. The rate at which the pig 156 is traveling in the pipe 104 may be controlled by the processor 124 operating the isolation valve 109 and/or the inlet valve 108. Additionally, the processor 124 may control the exhaust control valve 148 to allow more or less back pressure on the pig 156 in order to control the speed of the pig 156. Pig speed information from other sources such as the pig 156 itself or pig sensors 157 on the pipe 104 can be sent to or entered into the processor 124, which may be used to determine the correct volume and pressure input of the displacement fluid to achieve the desired pig speed.

Figure 3:
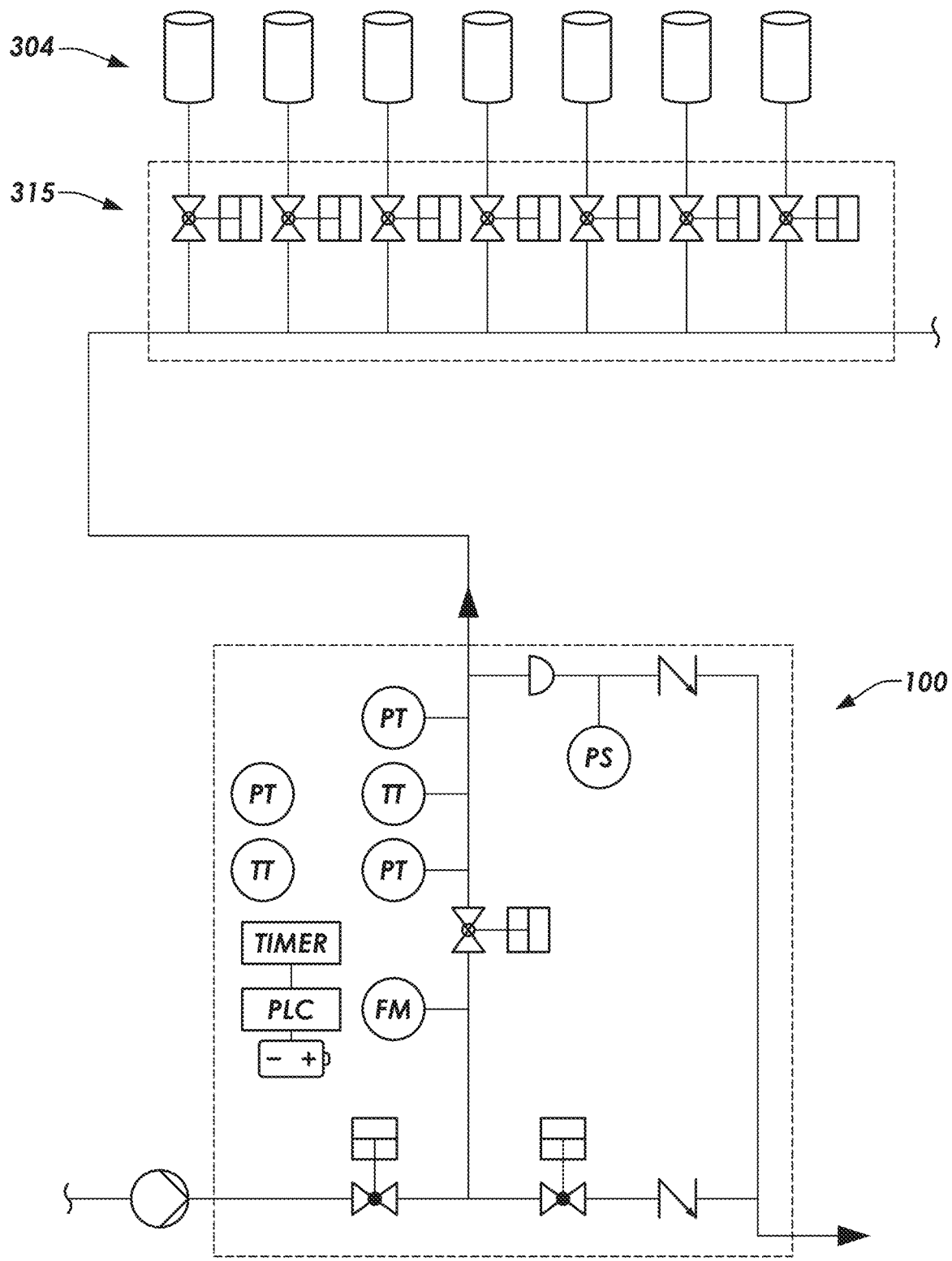
FIG. 3 is a schematic view of the pressure testing system in operation and coupled through a manifold to multiple specimens, depicted as various equipment at an oil/gas wellhead, consistent with certain embodiments of the present disclosure.

FIG. 3 illustrates a schematic view of the portable module 100 in operation and coupled through a manifold 315 to multiple specimens 304, depicted as various equipment at an oil/gas wellhead. For some embodiments, the multiple specimens 304 include one or more of a riser, various sections of a Christmas tree, a blowout preventer, casing, drill pipe, liner, separate conduits or bundled conduits. When testing of the multiple specimens 304 simultaneously using the manifold 315 and a leak is detected, the module 100 may proceed to isolate each specimen independently by sequentially closing valves of the manifold 315 and reperforming the pressure test to each one of the multiple specimens 304 in turn as described herein to determine which of the multiple specimens 304 are not holding pressure.

Figure 4:
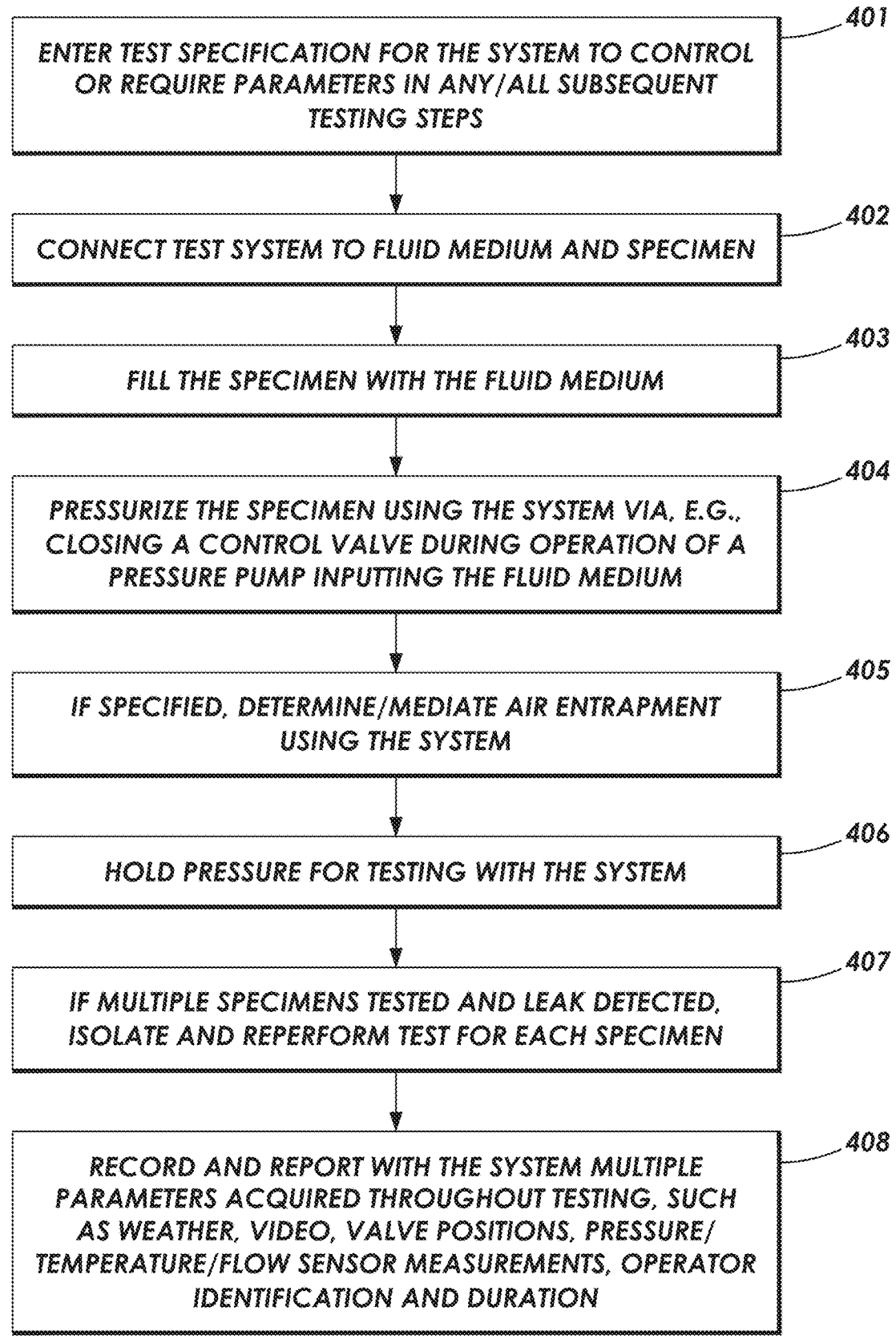
FIG. 4 is a flow diagram for a method of pressure testing a specimen, consistent with certain embodiments of the present disclosure.

FIG. 4 depicts a flow diagram for a method of pressure testing a specimen based on the foregoing detailed description. A setup step 401 includes the operator entering an operation specification into the system for the system to control and/or require certain test parameters, such as flow, minimum and maximum pressures and durations, throughout any/all subsequent testing steps. In coupling step 402, the operator connects a test system to a pressurized supply of fluid medium and to the specimen. For fill step 403, the fluid medium fills the specimen. During a pressurization step 404, the system adds additional fluid medium to the specimen in order to achieve desire pressure for testing (if the pressure is not rising commensurate with the volume added, the test is a failure). Operating a control valve of the system throughout the pressurization step 404 may change rate of pressurization in accordance with the specification. Some embodiments include an air venting step 405 where a determination is made by the system of trapped air being present in the specimen so that a fluid medium flow and/or venting of the air process may be implemented to mediate. In pressure hold step 406, the system maintains pressure in the specimen and records pressure readings throughout to determine pass/fail of the specimen. For some embodiments, an individual test step 407 triggers when multiple specimens tested together result in a leak detection such that each specimen is then isolated and tested independently. During the steps 403, 404, 405, 406, or 407 if measured parameters are not consistent with anticipated values (such as volume added or removed resulting in a certain pressure change), the test phase will be reported a failure unless overridden by the operator. In reporting step 408, the system sends to the operator or any other designees a record of the test outcome including data acquired throughout testing and associated with multiple parameters, such as weather, video, valve positions, pressure/temperature/flow sensor measurements, operator identifications, authorizations, approvals and durations.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A system for conducting a pressure operation with a specimen, comprising:
   a housing defining an exterior of a portable module with a supply port from the housing for coupling with the specimen to input fluid medium from the module into the specimen, wherein the fluid medium is provided to a location inside the portable module via one of: an inlet port into the housing and a self-contained supply of the fluid medium disposed in the housing;
   a conduit disposed in the housing connecting the supply port with the location inside the portable module where the fluid medium is provided;
   a valve disposed in the housing to control flow through the conduit;
   a pressure sensor disposed to sense pressure of the fluid medium in the conduit;
   a flow meter disposed to sense flow through the conduit; and
   a processor configured to: execute an operation specification inputted into the module for controlling the valve to adjust pressure in the specimen; record data from the flow meter and the pressure sensor; and output a report.

2. The system of claim 1, wherein the processor is further configured to control the valve based on input from a temperature sensor.

3. The system of claim 1, wherein the processor is further configured to control the valve based on input from the flow meter.

4. The system of claim 1, wherein the processor is further configured to control the valve based on input from the pressure sensor.

5. The system of claim 1, further comprising an overpressure relief device in the housing and coupled to the conduit to relieve pressure above a threshold in the specimen.

6. The system of claim 1, wherein the housing is a waterproof case enclosing the portable module.

7. The system of claim 1, wherein the specimen includes a pipe or pressure vessel located in a field or in a plant.

8. The system of claim 1, wherein the specimen is a pipeline and the processor is in communication with, or has information concerning location or travel speed or pressure in front of, or behind of, a pipeline pig and is further configured to alter rate of filling the pipeline or emptying the pipeline based on speed and/or location and/or pressure in front of, or behind of, the pig.

9. The system of claim 1, further comprising atmospheric pressure and temperature sensors disposed in the housing.

10. The system of claim 1, further comprising a camera in communication with the processor for incorporating images taken by the camera into the report.

11. The system of claim 1, further comprising an imaging system providing data to the processor for use to determine the existence of a leak.

12. The system of claim 1, wherein input of operational commands to the processor by an operator requires entry into the module of an identifier of the operator.

13. The system of claim 1, wherein the processor transmits the report out from the module to a remote location offsite from the specimen.

14. The system of claim 1, wherein the processor is in communication with a device to input commands into the processor, the device located at a remote location offsite from the specimen.

15. A method of conducting a pressure operation with a specimen, comprising:
    transporting a portable module to a site of the specimen;
    connecting the module to the specimen, wherein the specimen and the module are connected to a source for a fluid medium;
    inputting an operation specification into a processor disposed in the module;
    passing the fluid medium though a valve inside the module and then into the specimen;
    executing the operation specification with the processor that then controls the valve thereby adjusting pressure in the specimen through pressurization, hold pressure and depressurization phases in accordance with the operation specification;
    sensing pressure and flow of the fluid medium within the module to provide measured data; and
    outputting from the processor a report containing the measured data.

16. The method of claim 15, wherein the executing the operation specification with the processor occurs without human intervention.

17. The method of claim 15, wherein the specimen is initially tested with multiple specimens together using a manifold connecting all the specimens to the module and, if a leak is detected, the operation specification executed by the processor then proceeds to isolate and test a reduced number of the specimens together by closing valves of the manifold and reperforming the pressurization, hold pressure and depressurization phases.

18. The method of claim 15, further comprising inputting commands into the processor from a device located at a remote location offsite from the specimen.

19. A system for conducting a pressure operation with a specimen, comprising:
    a housing in shape of a case to define an exterior of a portable module;
    a source line coupling an inlet port into the housing with a fluid medium;
    a supply line coupling a supply port from the housing with the specimen to input the fluid medium from the module into the specimen;
    inlet, outlet and isolation valves disposed along a conduit in the housing through which the inlet port and the supply port are in fluid communication;
    flow and pressure sensors disposed in the housing along the conduit to measure properties of the fluid medium input into the specimen; and
    a processor disposed in the housing and configured to: execute an operation specification inputted into the module by controlling the valves in order to fill the specimen with the fluid medium and raise, hold and lower pressure within the specimen without additional input; record data from the sensors; and output a report.

20. The system of claim 19, wherein the report includes anomaly detection by the processor during execution of the operation specification.

21. The system of claim 19, wherein the processor is further configured to automatically stop conducting the pressure operation upon the processor detecting an anomaly.

22. The system of claim 19, wherein the report includes the data recorded and positions of the valves during an operation period.

* * * * *